United States Patent [19]
Piret

[11] 3,837,439
[45] Sept. 24, 1974

[54] BRAKE DEVICE FOR AN AUTOMATIC TRANSMISSION

[75] Inventor: Jean Piret, Bougival, France

[73] Assignees: Automobiles Peugeot, Paris; Regie Nationale Des Usines Renault, Billancourt, both of, France; part interest to each

[22] Filed: July 26, 1971

[21] Appl. No.: 166,071

[30] Foreign Application Priority Data
July 30, 1970 France .............................. 70.28141
June 30, 1971 France .............................. 71.23964

[52] U.S. Cl. ............... 188/72.6, 188/217, 188/366, 192/70.27, 192/85 AA, 192/109 A
[51] Int. Cl. ............................................ F16d 55/26
[58] Field of Search ......... 188/72.6, 72.3, 216, 217, 188/366, 71.5; 192/109 A, 89 B, 85 AA, 70.27

[56] References Cited
UNITED STATES PATENTS
2,599,214  6/1952  Wemp ............................. 192/89 B
2,669,330  2/1954  Banker ...................... 192/85 AA X
2,880,835  4/1959  Hass ......................... 192/85 AA X
2,914,142  11/1959  Klaue ............................... 188/72.3
2,966,978  1/1961  Kaptur ...................... 192/85 AA X
3,225,627  12/1965  Christenson ............... 192/85 AA X
3,236,349  2/1966  Wiggins et al. ................ 192/89 B X FOREIGN PATENTS OR APPLICATIONS
1,475,272  3/1969  Germany ........................... 192/89 B Primary Examiner—George E. A. Halvosa
Attorney, Agent, or Firm—Burns, Doane, Swecker & Mathis

[57] ABSTRACT

Brake device for an automatic transmission mechanism comprising discs which are shifted to the interengaged braking position by a hydraulic actuating device having a moving element. At least one spring washer is interposed between an abutment integral with the case of the brake device and the moving element so as to resiliently return the moving element to the released brake position.

8 Claims, 6 Drawing Figures

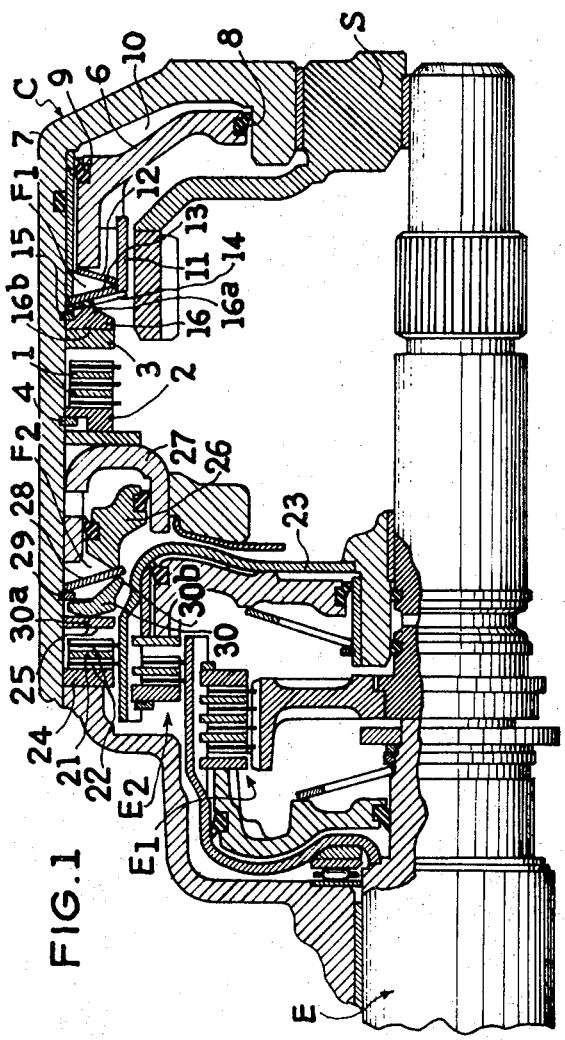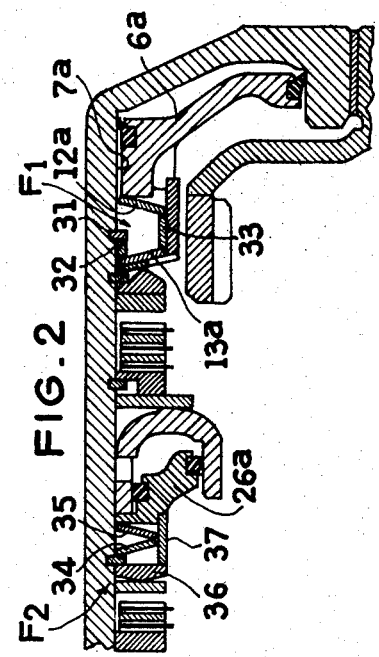

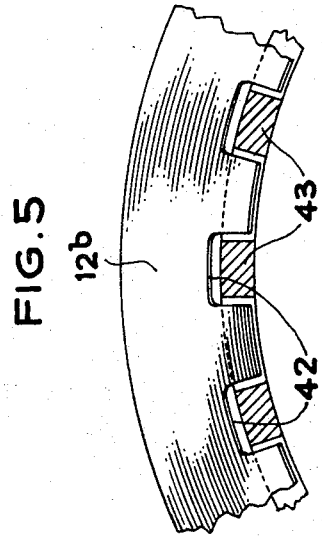
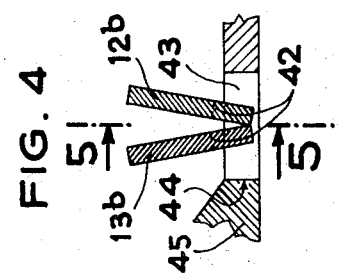
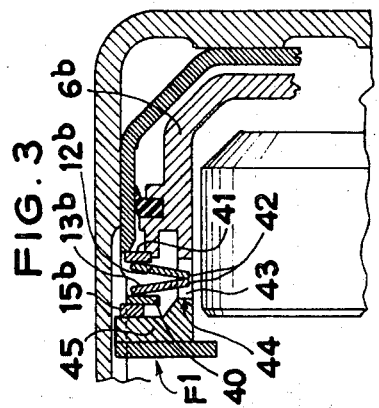
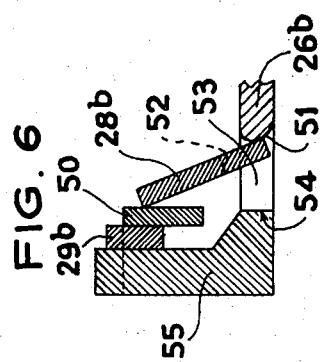

3,837,439

BRAKE DEVICE FOR AN AUTOMATIC TRANSMISSION

The present invention relates to transmission mechanisms having an automatic gear change, often called automatic transmissions used in particular on automobile vehicles.

These mechanisms usually comprise at least one planetary gearset and clutch and brake devices which are actuated hydraulically and determine the coupling or locking of a given element of the planetary gearset and consequently the transmission gear ratio. Usually the braking or holding devices are disposed at the periphery of the mechanism in the vicinity of the wall of the case with respect to which a series of discs or plates are prevented from rotating, and these plates are returned to the released disengaged position by means of springs, usually coil springs, which are compressed between ear portions which radially extend from the periphery of the plates. It will be understood that these ear portions are provided in sufficient number, for example three, and evenly spaced apart around the plates. This arrangement results in a number of drawbacks, among which may be mentioned the following: the brake plates have a large overall size and this affects the whole of the mechanism, since the case must include cavities of corresponding shape; moreover, they are expensive since, owing to these radial projections, they are complicated to manufacture in particular to ensure that they are strictly plane.

An object of the invention is to provide in such a transmission mechanism a device for returning the brake plates which does not have these drawbacks. This is achieved by employing as resiliently yieldable return means resiliently yieldable metal collars or washers which bear at one end against an abutment integral with the case, and at the other end against a moving part of the brake device.

According to a particular embodiment of the invention, at least one resiliently yieldable metal washer is interposed between the piston of the hydraulic actuating device and the pressure-applying plate of the brake.

Another difficulty which arises in such a mechanism concerns the supply of hydraulic fluid to the devices actuating the clutches and brakes. It will be understood that it is desirable to reduce the pressure of this hydraulic fluid and a preferred embodiment of the device according to the invention enables this pressure to be substantially reduced without however decreasing the pressure-applying force. In this preferred embodiment, there are provided two sets of resiliently yieldable metal washers, a first set including at least one of such washers interposed between the piston of the hydraulic actuating device and an abutment integral with the case, the function of this washer being to return the piston, and a second set including at least one washer interposed between the piston and an abutment integral with the case, this washer constituting a lever and acting moreover on the pressure-applying plate of the brake.

Preferably, in accordance with another feature, an intermediate collar is interposed between the pressure plate of the brake and the adjacent resiliently yieldable washer.

Another object of the invention is to provide an automatic transmission mechanism provided with clutches and brakes controlled hydraulically and having an improved return device such as that defined hereinbefore.

Further features and advantages of the invention will be apparent from the ensuing description with reference to the accompanying drawings.

In the drawings:

FIG. 1 is a partial sectional view of an improved automatic transmission mechanism according to the invention;

FIG. 2 is a similar partial sectional view of a first modification;

FIG. 3 is a view similar to FIG. 2 of another modification;

FIG. 4 is a detailed view, on an enlarged scale, of a part of the transmission shown in FIG. 3;

FIG. 5 is a sectional view taken along line 5—5 of FIG. 4, and

FIG. 6 is a view similar to FIG. 4 of a modification.

FIG. 1 shows a part of an automatically controlled transmission mechanism disposed in a case C and interposed between an input shaft E and an output shaft S. This mechanism comprises a planetary gearset (not shown) and clutch devices $E_1$, $E_2$ and brake devices $F_1$, $F_2$, the selective actuation of which determines the transmission ratio of the mechanism.

The invention more particularly relates to the brake devices $F_1$, $F_2$ which will consequently be described in more detail. The brake device $F_1$ comprises a first series of discs 1 which are prevented from rotating with respect to the case C and disposed between two plates 2, 3. The plate 2 is a support element which is maintained axially in position by a ring 4 and the other plate 3 is axially movable and constitutes a clamping or pressure-applying element actuated by a piston 6. The latter is slidably mounted in a cavity in the case which is defined in the embodiment shown in FIG. 1 by a cylindrical sleeve 7, the piston having on its inner periphery and on its outer periphery sealing elements 8, 9, which seal off a chamber 10 communicating with a source of fluid under pressure (not shown). The piston 6 carries a sleeve 11.

Interposed between the free edge of the piston 6 and the movable plate 3 are two resiliently yieldable washers 12, 13 in mutual contact along their inner periphery. The outer edge of the washer 12 is in contact with the free edge of the piston 6 and the outer edge of the other washer abuts the end of the sleeve 7. A third resiliently yieldable washer 14 is disposed, when the brake is in its unapplied condition as shown in the drawing, along the second washer 13 and abuts, on one hand, the sleeve 11 and, on the other hand, an abutment ring 15 or other abutment surface integral with the case. An intermediate disc 16, having a support point 16a in contact with the washer 14 and a plane face 16b in contact with the plate 3, is provided between the washer 14 and the plate 3.

It will be observed that the washers 12, 13 are solid and of the Belleville type, whereas the third washer 14, which is subjected to bending forces, constitutes a diaphragm spring, that is, it has, for example, a solid outer ring portion from which radially inwardly extend resiliently yieldable strips. The washers 12, 13 can be made from spring steel and have a thickness of about 1 mm for a pressure-applying or clamping force of the order of 40 – 60 kg.

The brake device F₂ also has a first series of discs 21 which are prevented from rotating with respect to the case and between which are interposed discs 22 which are connected to rotate with a clutch drum or bell-shaped member 23. The discs 21 are interposed between a thick support plate 24 and a movable pressure-applying or clamping plate 25 which is shifted by a piston 26 slidably mounted in a cylinder 27. Interposed between the piston 26 and the plate 25 are a resiliently yieldable washer 28 which is supported by a ring 29 or other abutment integral with the case C, and an intermediate or spacer washer 30 of aluminium having a convex face 30a in contact with the pressure-applying plate and a lip portion 30b in contact with the washer 28 in a position roughly in alignment with the point at which this washer is in contact with the piston 26.

The various unlined discs and plates are locked or held stationary with respect to the case C in the known manner by means of notches or splines (not shown) engaged in corresponding splines in the case.

The assembly just described operates in the following manner:

In order to apply the brake device $F_2$, which is the simplest, fluid under pressure is supplied to the chamber defined by the cylinder 27 and the piston 26, and the latter is shifted axially to the left, as viewed in FIG. 1, and exerts pressure on the pressure plate 25 through the Belleville washer 28 and the intermediate washer 30. The brake device $F_2$ is then applied. When the pressure is released, the Belleville washer, in bearing against the ring 29, urges the piston 26 to its position shown in FIG. 1 and the brake discs and plates shifted and separated under the effect of the rotation of the lined discs and of the lubricant.

The brake device $F_1$ operates in a slightly different manner owing to the more complex arrangement thereof. When the brake device is applied by the admission of fluid under pressure into the chamber 10, the piston 6 moves to the left, as viewed in FIG. 1, and acts on the washers 12, 13 and on the washer 14 through the sleeve 11.

The washers are mounted in such manner that, when the piston moves to the left, the axial movement of the inner edge of the washer 14 is roughly twice that of the two washers 12, 13 so that, in the course of this movement, the pressure-applying force is transmitted to the plate 3 solely through this third washer. As the third washer bears at one of its intermediate points against the spacer ring 16, a lever effect is achieved and the force is multiplied, so that it is possible to decrease the pressure of the hydraulic control fluid for a given pressure-applying force. In the illustrated embodiment, this multiplication corresponds to a ratio of about 2.

When the pressure is released in the chamber 10, the piston 6 is returned to its position shown in FIG. 1, principally under the action of the two washers 12, 13, the washer 13 bearing by its outer edge against the ring 15, whereas the other washer 12 bears against the edge of the piston. The third washer also has a secondary function of returning the piston but, as explained hereinbefore, its essential fuction is to achieve a multiplication of the pressure-applying force. As in the case of the brake device $F_2$, the discs are released by the effect of the rotation of the lined discs and of the lubricant.

In addition to the multiplication of the pressure-applying force mentioned hereinbefore, the advantages of this device result from the fact that the device returning the two pistons 6, 26, is entirely disposed within the case C with no need to provide in the latter cavities which extend radially outwardly for receiving ear portions integral with the brake plates. These brake plates are also simpler and consequently cheaper to produce. Moreover, the fact that these plates do not have radial ear portions avoids delicate machining problems otherwise encountered for imparting a strictly plane shape to the plates. Of course, these plates still have splines or notches on their outer periphery to lock them with respect to the case C, but the radial dimensions of the splines are substantially less than those of the aforementioned ear portions.

The gain in overall size advantageously affects the case C, this is of particular interest and enables the mechanism to be more easily located in the vehicle and in particular in a transverse power and drive unit.

In the embodiment shown in FIG. 2, the two brake devices are slightly modified. As concerns the brake device $F_1$, the cylindrical cavity 7a in which the piston 6a moves is directly machined in the case C and abutment means are provided for the washer 13a which are constituted by a ring 31 and a spacer member 32 whose left edge, as viewed in FIG. 2, is slightly radiused. Further, there is provided between the inner edges of the two washers 12a, 13a a spacer member 33 whose function is to result in an increased deformation of the two washers, possibly beyond vertical planes passing through the ends of this spacer member so that the travel of the pressure-applying plate can be increased and the number of brake discs increased. Owing to this arrangement, an increased travel is achieved without increasing the number of resiliently yieldable washers. The brake device $F_2$ is also modified in FIG. 2 and includes two Belleville washers 34, 35 and the piston 26 acts on an aluminum intermediate or spacer washer 36 through an entension member 37.

It will be understood that the same essential advantages mentioned hereinbefore are possessed by the embodiment shown in FIG. 2 so that further description thereof is unnecessary.

In the embodiment shown in FIGS. 3 - 5, the improvement concerns the return device associated with the piston actuating the brake device $F_1$. This return device is interposed between the actuating piston 6b and an abutment 40 integral with a ring 15b which is fixed with respect to the case C. The resiliently yieldable return washers 12b and 13b are disposed between this abutment and a support surface 41 carried by the piston and include notches 42 arranged along their inner periphery along which they are in contact. Further, the piston 6b is provided with extension portions 43 which freely extend through the notches 42 and bear by their end faces 44 against the pressure-applying plate 45 of the brake device $F_1$.

Thus it can be seen that the extension portions 43 of the piston perform the function which was performed by the sleeve 11 in the previously-described embodiment, that is to say, they exert pressure on the plate 45 and, for a given overall radial size, there is a substantial decrease in the inside diameter of the resiliently yieldable return washers which results in a reduction in the internal stresses and consequently a reduction in fatigue.

It will be understood that this arrangement can be employed in other brake or holding devices and in particular in the actuating device for the brake device $F_2$ shown in FIG. 2.

In the arrangement shown in FIG. 6, this same improvement is employed in the case of a single resiliently yieldable return washer for example corresponding to that which is provided in the brake device $F_2$ shown in FIG. 1. It can be seen that the washer 28*b* bears against an abutment 50 integral with a ring 29*b* and against shaped end portions 51 of the piston. The washer has notches 52 through which extension portions 53 of the piston extend, the end faces 54 of the extension portions abutting the brake plate 55. Although in this case the inside diameter of the washer has not been modified, the stresses in this region are considerably reduced.

Having now described my invention what I claim and desire to secure by Letters Patent is:

1. A brake device for an automatic transmission mechanism having means defining a case, a planetary gear train and a clutch assembly housed in said case and defining with the case an annular space, said brake device comprising at least a group of discs slidably received in said case, a pressure plate for applying an axial thrust to said discs and engaging the brake, a hydraulic actuating device comprising means defining a piston and cylinder unit extending at least partially into said annular space, said piston being slidably received in said cylinder and resiliently yieldable means for returning the brake device to the released position, said resiliently yieldable means comprising an abutment member fixed with respect to the case, and at least one resiliently yieldable metal return washer having an annular shape received in said annular space, said return washer having an outer edge portion and an inner edge portion and bearing in its outer edge portion against the abutment member and in its inner edge portion against said piston, the resiliently yieldable washer having notches along its inner edge portion and the piston comprising extension portions which extend freely through the notches and present end faces in contact with the pressure plate.

2. An automatic transmission mechanism comprising a case, a planetary gear unit and a clutch assembly within the case and defining therewith an annular space, at least one hydraulic brake device within said annular space, the device comprising discs slidably mounted with respect to the case, a hydraulic actuating device comprising means defining a piston and cylinder for pressing the discs together, a thrust member between said discs and the piston, and resiliently yieldable means for returning the piston to a brake released position, said resiliently yieldable means comprising an abutment member carried by the case, and at least one resiliently yieldable metal return washer having an outer edge portion and an inner edge portion defining radial notches, said return washer bearing in its outer edge portion against the abutment member and being submitted in its inner edge portion to the thrust of said piston, the latter having a plurality of extension portions extending freely through said notches of the return washer, said extension portions having end faces which are in engagement with said thrust member.

3. An automatic transmission mechanism as claimed in claim 2, wherein the piston of the hydraulic actuating device has shaped end portions between said extension portions, for engaging the adjacent inner end portion of the return washer.

4. An automatic transmission mechanism as claimed in claim 2, comprising two return washers, having outer edge portions and inner edge portions defining aligned notches, a first of said return washers having an outer edge portion in abutment against said abutment member, a second of said return washers having an outer edge portion in abutment against an outer end portion of the piston, the two return washers being in mutual engagement along their respective inner edge portions.

5. A brake device for an automatic transmission mechanism having means defining a case, a planetary gear train and a clutch assembly housed in the case and defining with the case an annular space, said brake device having a longitudinal axis and comprising a group of discs axially slidably mounted in the case, rigid pressure applying means for applying an axial thrust on the discs and engaging the brake, a hydraulic actuating device comprising means defining a piston and cylinder unit extending at least partially into said annular space, the piston being axially slidable in the cylinder between an extended position for applying the brake device and an inner position for releasing the brake device and having an end portion, an abutment integral with the case and located between the pressure applying means and the cylinder, resiliently yieldable annular washer means interposed between and engaging the abutment and the end portion of the piston for returning the piston to said inner position, and an axial extension extending the piston and capable of axially engaging and exerting a thrust on said pressure applying means when the piston is brought to said extended position of the piston, the extension defining an annular cavity with the case in which cavity said resiliently yieldable washer means are substantially located.

6. A brake device as claimed in claim 5, wherein the pressure applying means comprise an annular pressure plate and a rigid spacer washer interposed between the pressure plate and the extension of the piston.

7. A brake device as claimed in claim 6, wherein the rigid spacer washer has a convex face engaging the pressure plate.

8. A brake device as claimed in claim 5, wherein said resiliently yieldable washer means comprises a resiliently yieldable annular washer having an outer edge portion engaging the abutment and an inner edge portion, wherein said pressure applying means comprises an annular pressure plate, a rigid spacer washer, and said inner edge portion of said resiliently yieldable annular washer, wherein the axial extension of the piston comprises the end portion of the piston and wherein the end portion of the piston and the spacer washer contact opposite faces of the inner edge portion of the resiliently yieldable annular washer.

* * * * *